ился
United States Patent
Cartechini et al.

(10) Patent No.: US 10,443,306 B2
(45) Date of Patent: Oct. 15, 2019

(54) DRILLING MACHINE WITH OPTIMIZED TOOL UNLOADING SYSTEM

(71) Applicant: HPM—HYDRAULIC PERFORMANCE MACHINES SRL, Recanati (MC) (IT)

(72) Inventors: Giuseppe Cartechini, Recanati (IT); Luca Urbani, Montefano (IT)

(73) Assignee: HPM—HYDRAULIC PERFORMANCE MACHINES SRL, Recanati (MC) (IT)

( * ) Notice: Subject to any disclaimer, the term of this patent is extended or adjusted under 35 U.S.C. 154(b) by 616 days.

(21) Appl. No.: 15/116,658

(22) PCT Filed: Mar. 2, 2015

(86) PCT No.: PCT/EP2015/054308
§ 371 (c)(1),
(2) Date: Aug. 4, 2016

(87) PCT Pub. No.: WO2015/132204
PCT Pub. Date: Sep. 11, 2015

(65) Prior Publication Data
US 2016/0348437 A1 Dec. 1, 2016

(30) Foreign Application Priority Data
Mar. 3, 2014 (IT) .............................. MC2014A0021

(51) Int. Cl.
*E21B 3/04* (2006.01)
*E21B 7/02* (2006.01)
(Continued)

(52) U.S. Cl.
CPC .................. *E21B 3/04* (2013.01); *E21B 3/02* (2013.01); *E21B 7/005* (2013.01); *E21B 7/021* (2013.01); *F16H 47/04* (2013.01)

(58) Field of Classification Search
CPC ... E21B 3/02; E21B 3/04; E21B 7/005; E21B 7/021; F16H 47/04
See application file for complete search history.

(56) References Cited

U.S. PATENT DOCUMENTS 3,407,888 A * 10/1968 Graipin .................. E21B 7/001
175/173
3,605,910 A 9/1971 Deeter et al.
(Continued)

FOREIGN PATENT DOCUMENTS

WO     0133043 A1    5/2001

OTHER PUBLICATIONS

International Search Report for corresponding International Application No. PCT/EP2015/054308.

*Primary Examiner* — Daniel P Stephenson
(74) *Attorney, Agent, or Firm* — Egbert, McDaniel & Swartz, PLLC

(57) ABSTRACT

A drilling machine has a drilling tool, a rotary, a main engine that actuates a high-pressure pump, a hydraulic motor, actuated by the high-pressure pump and connected to the rotary at least one pressure sensor disposed in a discharge pipe. The fluid flows from the high-pressure pump to the hydraulic motor. An adjustment valve is disposed in a discharge pipe such that the fluid flows from a low-pressure circuit to the hydraulic motor in order to adjust the cylinder capacity of the hydraulic motor according to the pressure measured by the pressure sensor when the tool is unloaded.

10 Claims, 3 Drawing Sheets

(51) Int. Cl.
    *F16H 47/04*     (2006.01)
    *E21B 3/02*     (2006.01)
    *E21B 7/00*     (2006.01)

(56) References Cited

U.S. PATENT DOCUMENTS

| | | | |
|---|---|---|---|
| 3,910,358 A | 10/1975 | Martinek | |
| 6,318,235 B1* | 11/2001 | Allart | F03C 1/045 60/468 |
| 7,134,511 B2* | 11/2006 | Mayr | E21B 44/02 175/27 |
| 7,210,543 B1* | 5/2007 | Sumner | E21B 7/02 175/323 |
| 9,163,382 B2* | 10/2015 | Fraley | E02F 9/202 |
| 2002/0020563 A1 | 2/2002 | Baka | |
| 2005/0100415 A1* | 5/2005 | Larovere | E02D 5/801 405/232 |
| 2006/0120892 A1 | 6/2006 | Muona et al. | |
| 2015/0218947 A1* | 8/2015 | Vogel | E21D 20/003 405/259.1 |
| 2016/0303962 A1* | 10/2016 | Le Dren | F15B 11/08 |
| 2016/0348437 A1* | 12/2016 | Cartechini | E21B 3/02 |

* cited by examiner

DRILLING MACHINE WITH OPTIMIZED TOOL UNLOADING SYSTEM

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT Not applicable.

INCORPORATION-BY-REFERENCE OF MATERIALS SUBMITTED ON A COMPACT DISC

Not applicable.

BACKGROUND OF THE INVENTION

1. Field of the Invention

The present patent application for industrial invention relates to a drilling machine or drill provided with an optimized tool unloading system.

2. Description of Related Art Including Information Disclosed Under 37 CFR 1.97 and 37 CFR 1.98.

FIG. 1 shows a drilling machine, which is generally indicated with reference numeral (100). The drilling machine (100) comprises a drilling tool (U) used to drill holes into the ground. When the machine is operated, the tool (U) is driven into the ground to drill the hole. Afterwards, the tool (U) is extracted from the ground and unloaded, ejecting the soil that adheres to the tool. Unloading is obtained using the centrifugal force, by increasing the speed of rotation of the tool, and/or using the force of inertia, by stopping the tool suddenly in such way to remove the soil from the tool.

The drilling tool (U) is connected to a telescopic drilling bar, which is generally known as kelly bar (K).

The tool (U) is actuated by an actuation unit, which is generally known as rotary (R). The rotary (R) comprise a gear transmission composed of one or more pinions that engage in a toothed wheel fixed to the tool (U). The rotary (R) is mounted on a mobile support (101) in such manner to place the rotary in position and drive the tool into the ground.

As shown in FIG. 1A, the drilling machine (100) transmits the torque to the tool (U) by means of a kinematic chain composed of a hydraulic motor (M) with large size, generally with variable cylinder capacity, coupled with a speed gearbox (C) that in turns transmits motion to the toothed crown of the rotary (R). Although FIG. 1A shows two hydraulic motors (M) and two gearboxes (C) provided with output pinions that engage in the toothed wheel of the rotary (R), the following description will refer to one hydraulic motor and one gearbox, it being understood that the drill (100) can be provided with multiple hydraulic motors and multiple gearboxes.

The hydraulic motor is fed by a pump actuated by the main motor, generally an internal combustion engine, such a diesel engine.

The speed gearbox (C) is a device that contains at least one epicycloidal reduction gear and at least one clutch. As shown in FIG. 2, each epicycloidal reduction gear (2) comprises an input shaft (20) connected to the drive shaft of the hydraulic motor (M).

The input shaft (20) is connected to a planetary gear (21) that supports satellite gears (22) engaging on the external toothing of an output pinion (23) and on the internal toothing of a peripheral toothed wheel (24), which is known as fixed wheel. The output pinion (23) engages in the toothed wheel of the rotary (R).

The drive ratio of the motion of the epicycloidal reduction gear (2) is given by the Willis equation:

$$\tau_0 = \frac{\omega 2 - \omega p}{\omega 1 - \omega p}$$

wherein ωp is the angular speed of the input shaft (20) connected to the planetary gear, ω1 is the angular speed of the output pinion (23) that engages in the toothed crown of the rotary and ω2 is the angular speed of the peripheral toothed wheel (24).

By sending a pressure signal to the gearbox (C), the clutch of the gearbox (C) either blocks or unblocks the peripheral toothed wheel (24) of the epicycloidal gear, changing the drive ratio between the input shaft (20) and the output pinion (23) and consequently the speed of rotation of the tool (U). In practical terms, when the gearbox (C) is hydraulically actuated, the drive ratio is 1:1, whereas when the gearbox (C) is not actuated, the ratio is higher, generally 1:4, 1:5 or 1:6.

In some instances an auxiliary hydraulic motor (not shown in the figures) is used instead of the gearbox (C) to unload the tool (U), said auxiliary motor having a fixed cylinder capacity and dimensions lower than the hydraulic motor (M). During the unloading operation the hydraulic motor (M) is disconnected and the auxiliary motor is activated. The hydraulic motor (M) is powered by one or more pumps with variable cylinder capacity that adjust their cylinder capacity according to the load and other parameters. The pumps are powered by the diesel engine.

During the drilling operation the variable cylinder capacity of the hydraulic motor (M) allows for changing the speed of the tool (U) (regardless of the gearbox (C)) according to the ground conditions. However, during the drilling operation, it is better to operate the tool at constant speed, without changing the cylinder capacity of the hydraulic motor.

Hydraulic motors that progressively change their cylinder capacity according to the pressure on the motor are known. However, this type of hydraulic motors are not used for drilling machines because during the drilling operation it is better to operate with a constant speed and accordingly with a constant cylinder capacity.

In the following description, the term "minimum cylinder capacity" is the minimum cylinder capacity that can be physically reached by the motor without breaking down; the term "maximum cylinder capacity" is the maximum cylinder capacity that can be geometrically reached by the motor; the term "low cylinder capacity" is a cylinder capacity comprised between 20% and 40% of the maximum cylinder capacity; and the term "high cylinder capacity" is a cylinder capacity comprised between 80% and 100% of the maximum cylinder capacity.

It must be considered that the torque of the hydraulic motor is in direct relation to the cylinder capacity and is defined by the following formula:

$$\text{Torque} = \frac{\text{Cylinder capacity} * \Delta P * \eta}{20 * \pi} * k1$$

wherein ΔP is the difference in pressure between upstream (input) and downstream (output) of the hydraulic motor, η is the output of the hydraulic motor and k1 is a proportionality constant.

On the contrary the speed of the output shaft of the hydraulic motor is in inverse relation to the cylinder capacity and is defined by the following formula:

$$\text{Speed} = \left(\frac{1000 * \text{Capacity} * \eta}{\text{Cylinder capacity}}\right) * k2$$

wherein k2 is a proportionality constant and the capacity is given by the following formula:

$$\text{Capacity} = \frac{\text{Power}}{\Delta P} * k3$$

In general, in order to work on very hard ground, most drills change the cylinder capacity of the hydraulic motor (M) in such manner to operate it with high cylinder capacity and have a higher torque to drill the ground.

Instead, drills of different manufacturers differ in the operation during the unloading of the tool.

It must be noted that, in case of medium-sized machines, the mass of the kelly bar (K) and the tool (U) filled with soil can reach 11,000-12,000 kg.

Until today the unloading of the tool in drilling machines is made in the following ways:
  only by means of the centrifugal force (by turning the tool rapidly, the centrifugal force tends to remove the soil excavated by the tool) or
  by means of the centrifugal force and the force of inertia obtained by stopping the tool suddenly.

The machines that operate by means of the centrifugal force can work in two different ways:
  setting the hydraulic motor (M) at the minimum cylinder capacity to obtain the maximum speed of the tool (U) without overrunning the gearbox (C); or
  disconnecting the main hydraulic motor and connecting the auxiliary hydraulic motor that, having a small cylinder capacity, guarantees a high speed of rotation of the tool. In such a case, the overrunning of the gearbox (C) is avoided because the gearbox (C) is by-passed and the auxiliary hydraulic motor is provided with its own reduction gear with a low drive ratio, which therefore can withstand high input speeds.

On the contrary, in the machines that unload the tool by means of the centrifugal force and the force of inertia, the tool is operated at a high speed of rotation and is stopped, inverting the direction of rotation and repeating this operation several times. Generally, this is the operation mode of the machines with gearbox (C).

However, in both cases the cylinder capacity of the main hydraulic motor (M) or the auxiliary hydraulic motor is fixed during the unloading operation. As a matter of fact, the cylinder capacity of the main hydraulic motor (M) is fixed by the manufacturer of the drilling machine at a minimum value that prevents the overrunning of the gearbox (C). Instead, the auxiliary motor has a fixed (not variable) cylinder capacity that is chosen by the machine manufacturer.

When a motor with fixed cylinder capacity is used during the unloading of the tool, the load on the machine pumps is quite high, having to accelerate a very large mass. Therefore, for a few seconds, the hydraulic system must operate at the maximum pressure, meaning that oil is discharged through a safety valve of the hydraulic system, which is known as pressure relief valve. This causes the overheating of the hydraulic fluid in the hydraulic system, which is considerably heated also during drilling, when the machine generally works at pressure values close to the maximum pressure.

Consequently, the unloading of the tool risks heating the oil further, instead of cooling it down. The temperature increase of the fluid in the hydraulic system impairs the performance of the machine. As a matter of fact, when a certain temperature is reached, the machine computer will reduce the power of the diesel engine to protect the pumps, the gaskets and the other parts of the hydraulic system.

In addition to the overheating of the hydraulic system, also the performance of the drilling machines of known type is impaired. As a matter of fact, it is difficult to accelerate a mass of 11,000-12,000 kg with an engine that works at the minimum cylinder capacity with a low torque. The performance of the machines provided with gearbox (C) in which the tool is unloaded by means of the force of inertia and the centrifugal force can be so modest to induce the operator not to operate the machine with the gear having the lowest gear ratio.

In the drilling machines provided with gearbox, such an inconvenience may be partially solved if during the unloading of the tool, the operator starts the unloading operation with a low gear and gradually uses higher gears in order to increase the speed. However, it must be considered that gear changing is not an easy operation in drilling machines and the operator generally performs the entire unloading operation with the same gear, which is empirically chosen according to the user's experience.

US2002/0020563 discloses an auger system having a hydraulic motor capable of two speed operation.

U.S. Pat. No. 3,910,358 discloses a portable horizontal earth boring machine that uses two or more hydraulic motors to rotate and advance the auger into the ground.

US2006/0120892 discloses a hydraulic system for mining equipment and a method to adjust the power of the rock drill machine.

WO01/33043 discloses a method and a device of controlling a rock drilling machine.

U.S. Pat. No. 3,605,910 discloses an auger machine having an auger carriage moved by a hydraulic cylinder.

The purpose of the present invention is to eliminate the drawbacks of the prior art by devising a drilling machine that is efficient, effective and reliable during the unloading phase of the tool.

BRIEF SUMMARY OF INVENTION

The drilling machine of the invention comprises:
  a drilling tool used to drill holes into the ground,
  a rotary connected to said tool in order to drive it into rotation,
  a main motor that actuates at least one high-pressure pump to make a fluid circulate in a high-pressure hydraulic system, and a hydraulic motor with variable cylinder capacity actuated by said high-pressure pump and connected to said rotary to make the tool rotate.

The innovative characteristics are represented by the fact that the drilling machine of the invention also comprises:
- at least one pressure sensor disposed in a discharge pipe wherein the fluid flows from the high-pressure pump to the hydraulic motor, in order to detect the input pressure of the hydraulic motor, and
- an adjustment valve disposed in a discharge pipe wherein the fluid flows from a low-pressure circuit to the hydraulic motor in order to adjust the cylinder capacity of the hydraulic motor.

The hydraulic motor is set with a high cylinder capacity at the beginning of the unloading phase of the tool. The pressure sensor is operatively connected to said adjustment valve to adjust the cylinder capacity of the hydraulic motor according to the pressure detected by the pressure sensor during the tool unloading phase.

It must be considered that the adjustment valve is normally closed and is open (activated) only during the unloading phase of the tool. Therefore, during drilling, the hydraulic motor is actuated in a traditional way, setting a constant speed of the tool.

The advantages of the drilling machine of the invention are evident. Unlike the machines of known type, the machine of the invention starts unloading the tool by operating the hydraulic motor with high cylinder capacity in order to have a high breakaway torque. Then, during the unloading of the tool, the cylinder capacity of the hydraulic motor is gradually reduced by means of a pressure sensor that detects the pressure on the hydraulic motor.

Additional characteristics of the invention will become more clearly apparent from the following description, which refers to a merely illustrative and not limiting embodiment, illustrated in the accompanying drawings, in which:

DETAILED DESCRIPTION OF THE INVENTION

Figure 1:
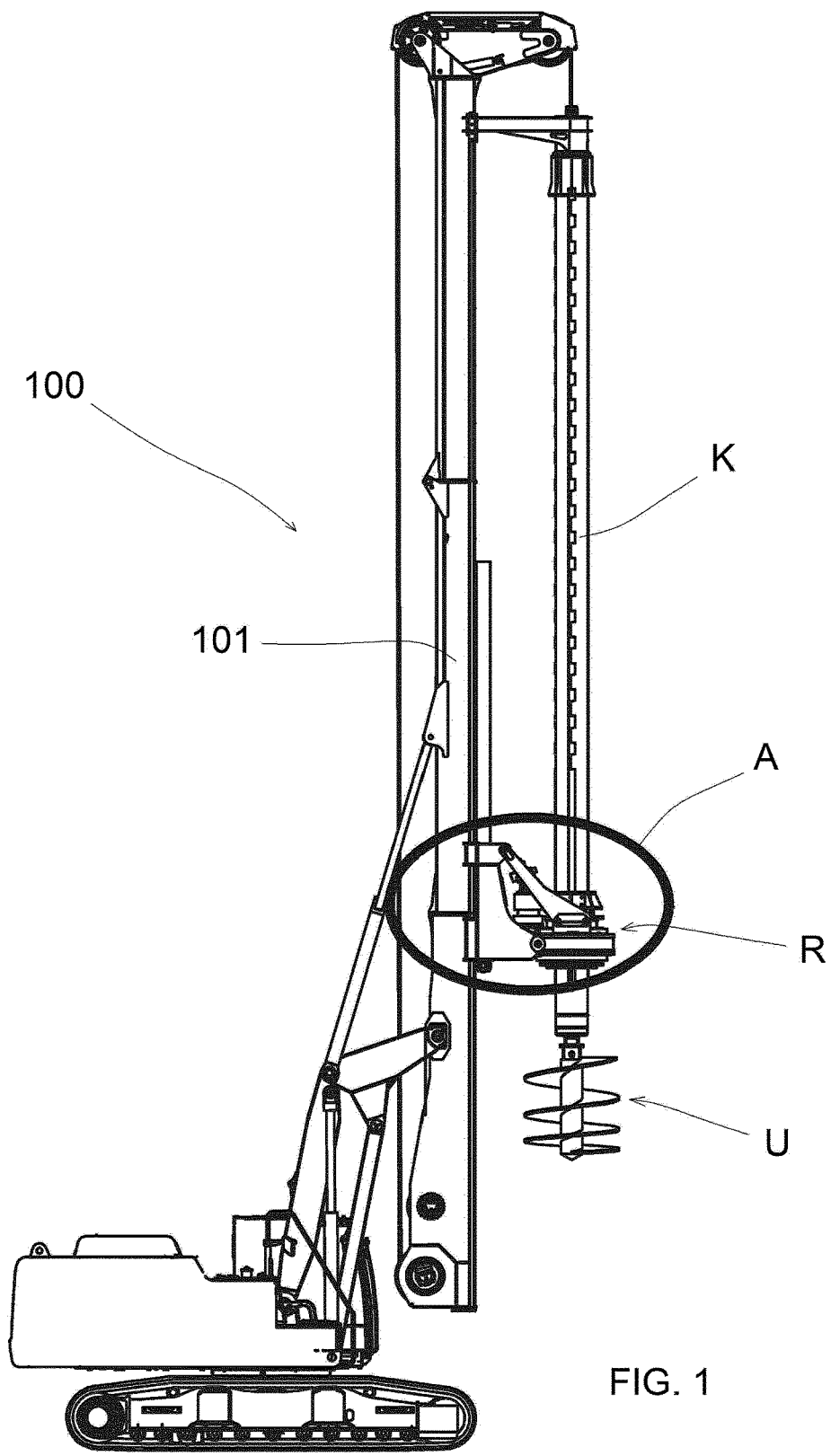
FIG. 1 is a side view of a generic drilling machine.

Referring to the figures, a drilling machine according to the invention is disclosed, being generally indicated with reference numeral (100). Hereinafter elements that are identical or correspond to the ones described above are indicated with the same reference numbers, omitting their detailed description.

Figure 1A:
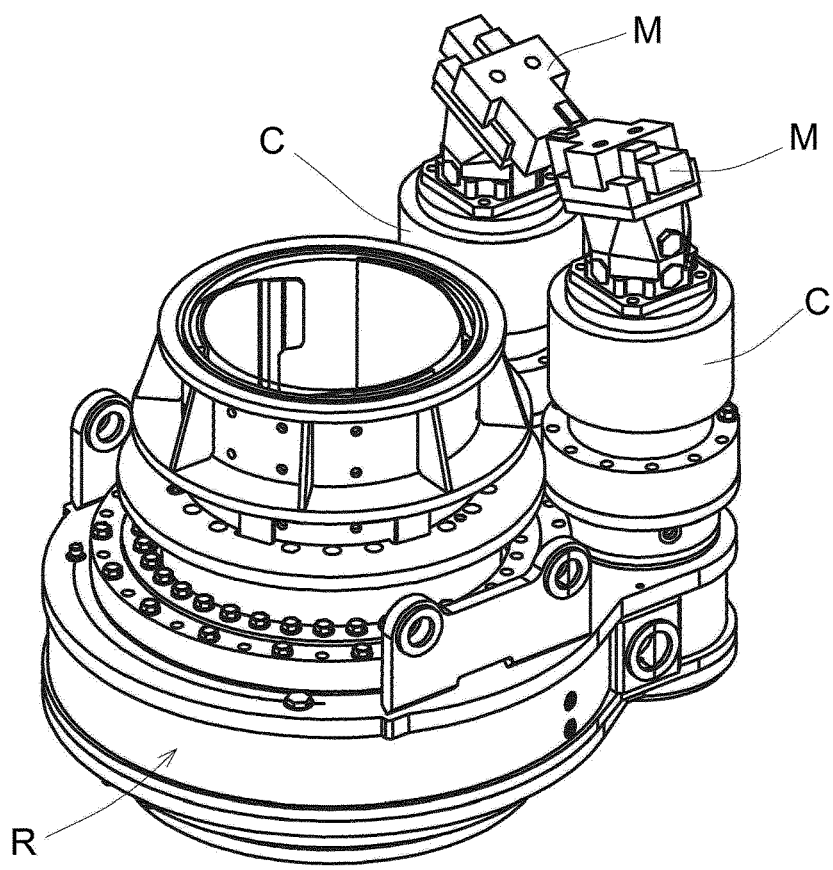
FIG. 1A is a perspective view of the detail enclosed in circle A of FIG. 1.
Figure 2:
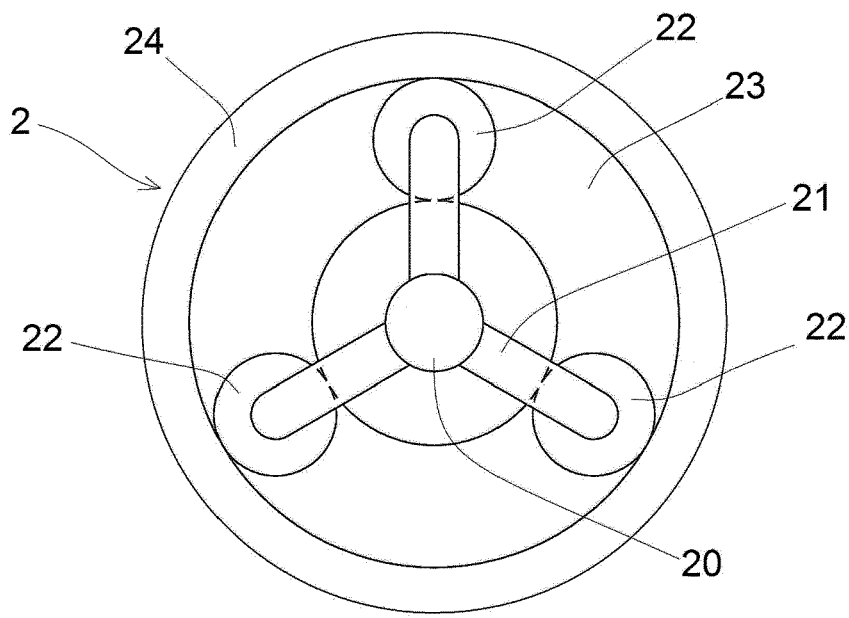
FIG. 2 is a diagrammatic plan view of an epycicloidal reduction gear of the gearbox of the machine of FIG. 1.

The drilling machine of the invention (100) has a structure such as the one illustrated in FIG. 1, a rotary (R) such the one illustrated in FIG. 1A and a epycicloidal reduction gear (2) such as the one shown in FIG. 2.

Figure 3:
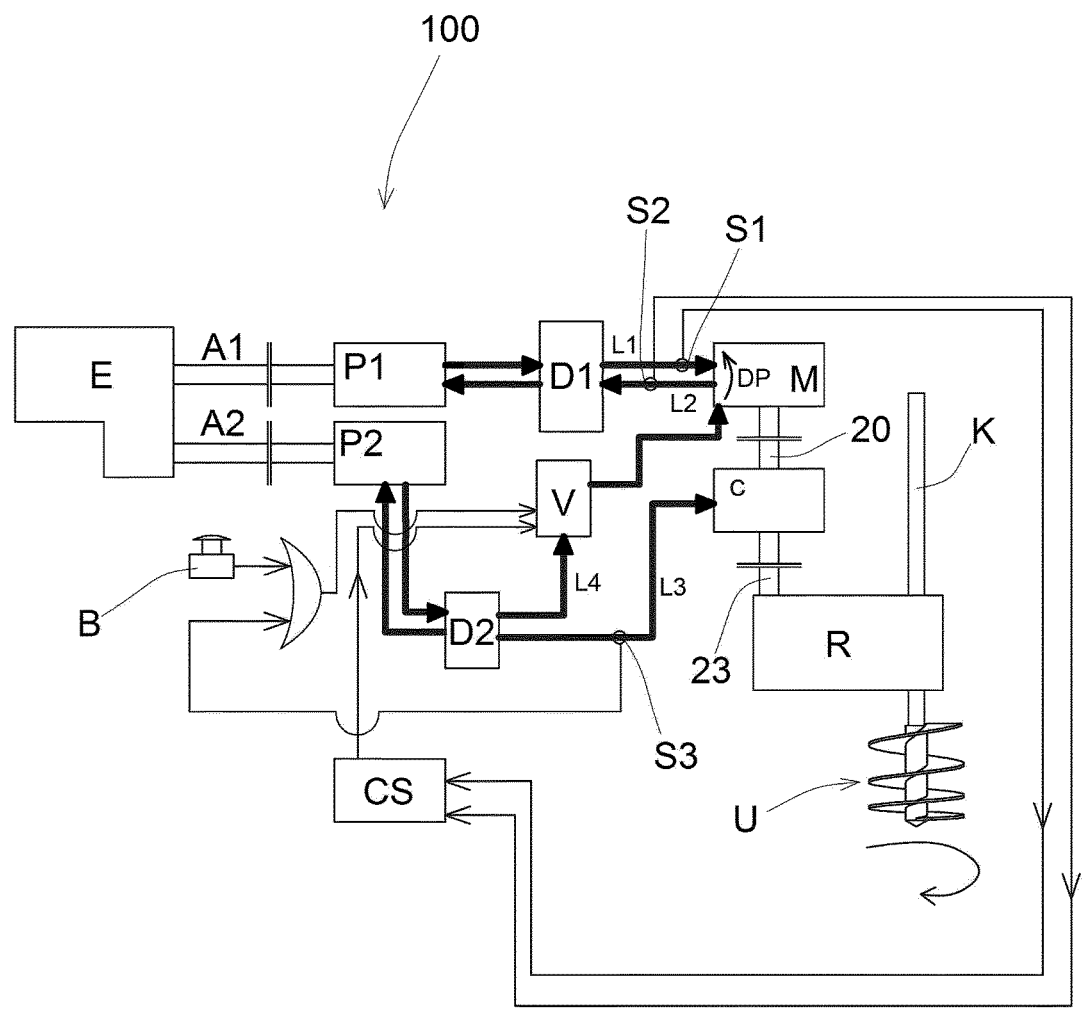
FIG. 3 is a block diagram of the drilling machine of the invention.

As shown in FIG. 3, the machine (100) comprises a main motor (E), preferably an internal combustion engine, such as a diesel engine.

The main motor (E) comprises at least two power take-offs, to which two power take-off shafts (A1, A2) are connected, respectively actuating a first pump (P1) and a second pump (P2).

The first pump (P1) is inserted in a high-pressure oil hydraulic circuit (pressure higher than 300 bar, generally approximately 350 bar). The second pump (P2) is inserted in a low-pressure oil hydraulic circuit (pressure lower than 60 bar, generally approximately 40-60 bar). The provision of the second pump can be avoided, supplying the low-pressure circuit by draining the oil and reducing the pressure from the high-pressure circuit.

The first pump (P1) is provided with an oil discharge pipe and an oil return pipe connected to a first distributor (D1) adapted to be connected to all the machine parts that require high-pressure oil. Therefore the first distributor (D1) is connected to a hydraulic motor (M) by means of a discharge pipe (L1) and a return pipe (L2) of the oil.

The hydraulic motor comprises an output shaft connected to an input shaft (20) of a gearbox (C). The gearbox (C) comprises a pinion (23) that engages in a toothed wheel of the rotary (R). The toothed wheel of the rotary (R) is connected to a kelly bar (K) that supports a drilling tool (U) in such manner to make the tool (U) rotate.

The second pump (P2) is provided with a discharge pipe and a return pipe of the oil connected to a second distributor (D2) adapted to be connected to all the machine parts that require low-pressure oil. Therefore the second distributor (D2) is connected to the gearbox (C) by means of an oil discharge pipe (L3). In view of the above, the low-pressure oil flowing in the pipe (L3) actuates a clutch of the gearbox (C) so that the gearbox (C) can change the speed of rotation of the output pinion (23) that actuates the toothed wheel of the rotary.

Advantageously the gearbox (C) comprises at least one epicycloidal reduction gear (2) such as the one illustrated in FIG. 2 and the clutch of the gearbox (C) either blocks or unblocks the peripheral toothed wheel (24) of the epicycloidal reduction gear (2).

According to the invention, a pressure sensor (S1) is inserted in the discharge pipe (L1) going from the first distributor (D1) to the hydraulic motor (M) in order to detect the input pressure in the hydraulic motor (M). Considering that the output pressure of the hydraulic motor (M) is generally of a few bars, in such a case the pressure difference (ΔP) between the input and the output of the hydraulic motor is approximately identical to the pressure measured by the pressure sensor (S1).

Nevertheless, in order to obtain a more accurate measurement of the pressure difference (ΔP) between the input and the output of the hydraulic motor, a second pressure sensor (S2) is disposed on the return pipe (output) (L2) of the hydraulic motor. In view of the above, the pressure difference (ΔP) between the input and the output of the hydraulic motor is exactly the pressure measured by the first pressure sensor (S1) minus the pressure measured by the second pressure sensor (S2).

Moreover, the provision of two pressure sensors (S1, S2) provides an accurate pressure measurement also in case of a bi-directional motor, i.e. a motor that rotates in two directions of rotation, in which the discharge pipe and the return pipe are inverted according to the direction of rotation of the hydraulic motor.

The pressure sensors (S1, S2) are electrically connected to a control unit (CS) that receives the electrical signals that are indicative of the pressure values detected by the pressure sensors (S1, S2).

The second distributor (D2) is hydraulically connected to the hydraulic motor (M) by means of a discharge pipe (L4). An adjustment valve (V) is disposed in the discharge pipe (L4) between the second distributor (D2) and the hydraulic motor (M) in order to adjust the oil supply from the second distributor to the hydraulic motor in such manner to adjust the cylinder capacity of the hydraulic motor (M).

The adjustment valve (V) comprises a shutter that can be adjusted in position in order to adjust the oil flow to the hydraulic motor (M). Preferably, the adjustment valve (V) is an electrically-operated valve. However, the adjustment valve (V) may also be a non-electrically operated valve, for example a hydraulically-operated valve.

If the adjustment valve (V) is an electrically-operated valve, it is electrically connected to the control unit (CS). So the oil pressure from the second distributor (D2) to the hydraulic motor (M) is adjusted in compliance with the pressure difference (ΔP) measured by the pressure sensors (S1, S2). The control unit (CS) sends an electrical signal to the adjustment valve (V), said signal being proportional to the pressure difference (ΔP) measured by the sensors (S1, S2), in order to actuate the shutter of the adjustment valve.

The adjustment valve (V) is normally closed and is opened (activated) only when the tool is unloaded. Therefore, during drilling, the hydraulic motor (M) is actuated traditionally, without the intervention of the adjustment valve (V), thus allowing for setting a constant speed of the tool during drilling as desired.

Manual and/or automatic systems are provided in order to make sure that the adjustment valve (V) is operated only when the tool is unloaded and not during drilling.

The adjustment valve (V) can be actuated manually with a button (B) that is pressed by the operator when the unloading operation of the tool (U) is enabled.

Advantageously, a pressure switch (S3) is disposed in the discharge pipe (L3) going from the second distributor (D2) to the gearbox (C). The pressure switch (S3) detects the presence or the absence of pressure in the input of the gearbox (C) and accordingly activates or deactivates the adjustment valve (V). As a matter of fact, it must be considered that in some models of machines, when unloading the tool, pressure is sent to the gearbox (C); on the contrary, in other models of machines, when unloading the tool, a low pressure or no pressure is present at the input of the gearbox (C).

In the machines provided with gearbox (C) the tool (U) is generally unloaded by means of the centrifugal force and the force of inertia, using an unloading gear that is set by the operator. The system of the invention instantaneously detects the load on the hydraulic motor (M) of the rotary according to the pressure value measured by the pressure sensors (S1, S2) and adjusts the cylinder capacity of the hydraulic motor (M) according to the pressure values as illustrated in the following description.

At the beginning of the tool unloading operation, the cylinder capacity of the hydraulic motor (M) is high (80-100% of the maximum cylinder capacity) in such manner to have a high torque and accelerate the tool (U) rapidly.

When the speed of rotation of the tool increases, the pressure sensors (S1, S2) detect a reduction in pressure. Consequently, the control unit (CS) controls the adjustment valve (V) in order to lower the cylinder capacity of the hydraulic motor (M) because a lower torque and a higher speed are needed.

The adjustment valve (V) adjusts the cylinder capacity of the hydraulic motor (M) up to the cylinder capacity set by the operator and in any case not under the minimum cylinder capacity that would result in such a high speed to cause the failure of the gearbox (C).

According to the system of the invention, when accelerating the tool (U) during the unloading operation, the first pump (P1) will not work in maximum pressure and oil will not be discharged through the pressure relief valve in view of the fact that the hydraulic motor is initially set with a high cylinder capacity and needs a lower pressure from the first pump (P1) to accelerate and unload the tool. This avoids overpressure and consequently reduces oil overheating in the high-pressure hydraulic system. Moreover, it avoids the opening of a pressure relief valve that would cause energy dissipation in the form of heat.

The adjustment valve (B) is closed (deactivated) when the unloading operation is completed. Therefore, when drilling, the hydraulic motor (M) can operate at constant speed and constant cylinder capacity, without the intervention of the adjustment valve.

The system of the invention is also advantageous in terms of machine consumption, because it avoids pressure peaks on the hydraulic motor (M) for the acceleration of the tool (U) during unloading that involve sudden loads on the diesel engine (E) with higher consumption.

It must be considered that the maximum efficiency of the system of the invention is obtained with a screw-shaped tool (U) because with this type of tool the centrifugal force allows for expulsion from the ground. Other types of tools are available, such as buckets, i.e. cylinders provided with a bottom lid that can be opened with a lever system. In such a case, speed is not important. As a matter of fact, after opening the lid, the is rotated rapidly to remove the remaining earth.

Variations and modifications can be made to the present embodiments of the invention, within the reach of an expert of the field, while still falling within the scope of the invention as illustrated in the attached claims.

The invention claimed is:

1. A drilling machine comprising:
   a drilling tool used to drill holes into the ground,
   a rotary connected to said tool to drive the tool into rotation,
   a main motor actuating at least one high-pressure pump to make a fluid circulate in a high-pressure hydraulic system, and
   at least one hydraulic motor with variable cylinder capacity actuated by said high-pressure pump and connected to said rotary in order to make the tool rotate,
   characterized in that drilling machine also comprises:
   at least one pressure sensor disposed in a discharge pipe wherein the fluid flows from the high-pressure pump to the hydraulic motor, in order to detect the input pressure of the hydraulic motor, and
   an adjustment valve disposed in a discharge pipe wherein the fluid flows from a low-pressure circuit to the hydraulic motor in order to adjust the cylinder capacity of the hydraulic motor only when the tool is unloaded,
   wherein said hydraulic motor has a high cylinder capacity at the beginning of the unloading operation of the tool and said pressure sensor is operatively connected to said adjustment valve in order to adjust the cylinder capacity of the hydraulic motor (M) according to the pressure measured by the pressure sensor when the tool is unloaded.

2. The drilling machine of claim 1, wherein said high cylinder capacity of the hydraulic motor at the beginning of the unloading operation of the tool is comprised between 80 and 100% of the maximum cylinder capacity that can be geometrically reached by the hydraulic motor.

3. The drilling machine of claim 1, wherein said adjustment valve is an electrically-operated valve and said drilling machine also comprises a control unit electrically connected to said pressure sensor and to said electrically-operated valve in order to control the electrically-operated valve according to the pressure measured by said pressure sensor.

4. The drilling machine of claim 1, also comprising:
a first pressure sensor disposed in said discharge conduit wherein the fluid flows from the high-pressure pump to the hydraulic motor;
a second pressure sensor disposed in a return pipe wherein the fluid flows from the hydraulic motor to the high-pressure pump, in such manner to detect a pressure difference ($\Delta P$) between the input and the output of the fluid of the hydraulic motor.

5. The drilling machine of claim 1, also comprising a gearbox disposed between said hydraulic motor and said rotary to change the speed of rotation of the rotary with respect to the speed of rotation of the hydraulic motor.

6. The drilling machine of claim 5, comprising a low pressure hydraulic system in which a low pressure fluid circulates, as well as a discharge pipe going from said low pressure hydraulic system to said gearbox to control the speed variation of the gearbox.

7. The drilling machine of claim 6, comprising a pressure switch disposed in said discharge pipe going from said low pressure hydraulic system to said gearbox in order to detect the presence or absence of pressure in said discharge pipe, said pressure switch being operatively connected to said adjustment valve in order to activate/deactivate said adjustment valve according to the presence or absence of pressure.

8. The drilling machine of claim 5, wherein said gearbox comprises at least one epycicloidal reduction gear and at least one clutch that blocks or unblocks a peripheral toothed wheel of said epycicloidal reduction gear.

9. The drilling machine of claim 1, also comprising a button adapted to be manually actuated by the operator, said button being operatively connected to said adjustment valve to activate/deactivate said adjustment valve.

10. The drilling machine of claim 1, wherein said tool is shaped as a screw.

* * * * *